United States Patent [19]

Kearney

[11] 4,096,066

[45] Jun. 20, 1978

[54] TREATING CONTAMINATED LIQUIDS

[76] Inventor: Thomas John Kearney, 34 Droitwich Rd., Worcester, England

[21] Appl. No.: 726,565

[22] Filed: Sep. 27, 1976

Related U.S. Application Data

[60] Division of Ser. No. 647,735, Jan. 9, 1976, Pat. No. 3,994,808, which is a continuation of Ser. No. 295,939, Oct. 10, 1972, abandoned, which is a continuation of Ser. No. 51,954, Jul. 2, 1970, abandoned.

[30] Foreign Application Priority Data

Jul. 5, 1969 United Kingdom ............... 33975/69
Apr. 21, 1970 United Kingdom ............... 18928/70

[51] Int. Cl.$^2$ ............................................. B01D 21/00
[52] U.S. Cl. ................................. 210/195 R; 55/228; 98/115 SB; 210/523
[58] Field of Search ............... 210/70, 74, 83, 84, 210/167, 169, 195, 197, 525, 523; 55/85, 228; 98/115 SB

[56] References Cited

U.S. PATENT DOCUMENTS

| | | | |
|---|---|---|---|
| 2,381,760 | 8/1945 | Latham, Jr. ...................... | 210/197 X |
| 3,123,455 | 3/1964 | Paasche .......................... | 210/167 X |
| 3,173,865 | 3/1965 | Bosico ................................ | 210/169 |
| 3,395,800 | 8/1968 | Kraus et al. ...................... | 210/525 X |
| 3,398,089 | 8/1968 | Mackrle et al. .................. | 210/197 X |

*Primary Examiner*—John Adee
*Attorney, Agent, or Firm*—Robert F. O'Connell

[57] ABSTRACT

The invention provides a method and apparatus for treating liquids containing additional materials in which surface liquid is caused to flow from the main body of a liquid and is reintroduced under pressure either beneath the surface of the main body or beneath or onto the surface of a further liquid body. The method has application in sinking paint particles in the air-washing water of paint spray booths for example, and also in mixing materials of which one is contained in or forms a body of liquid.

6 Claims, 4 Drawing Figures

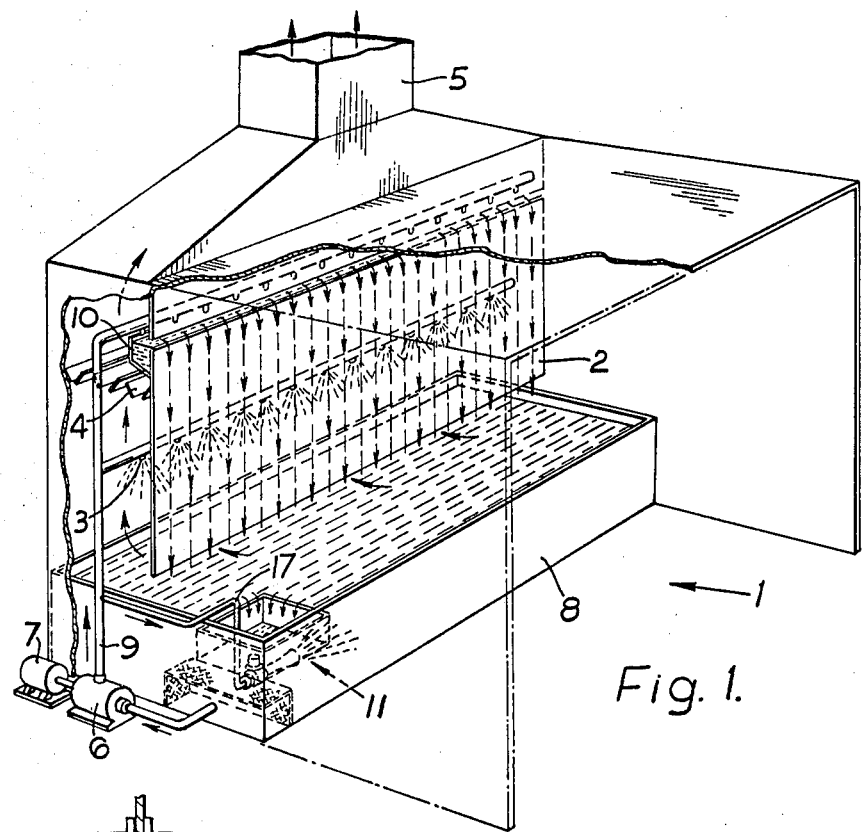
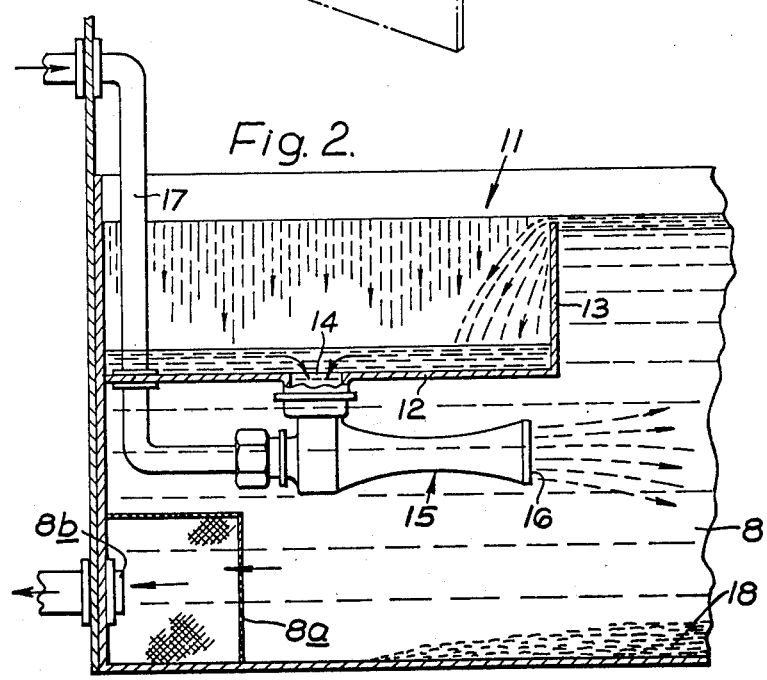

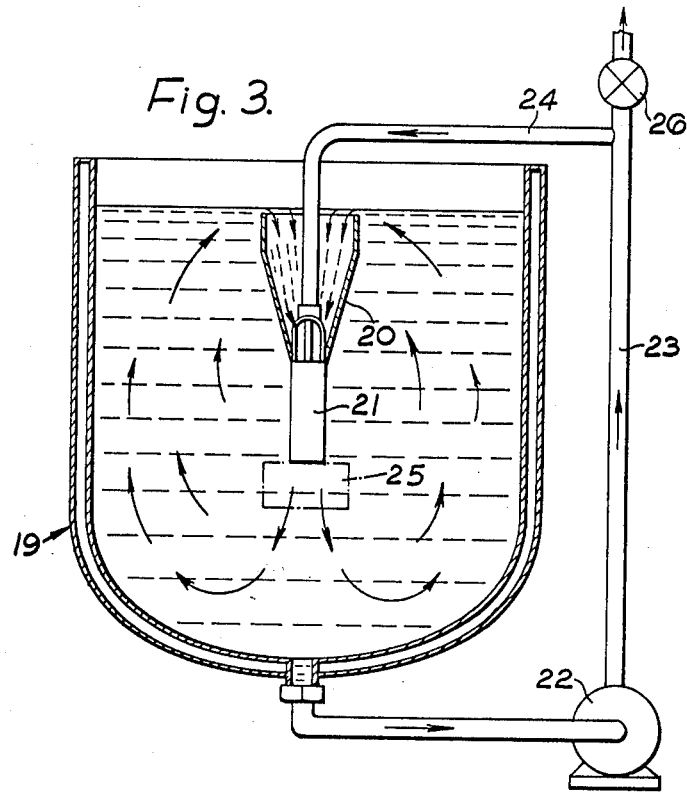
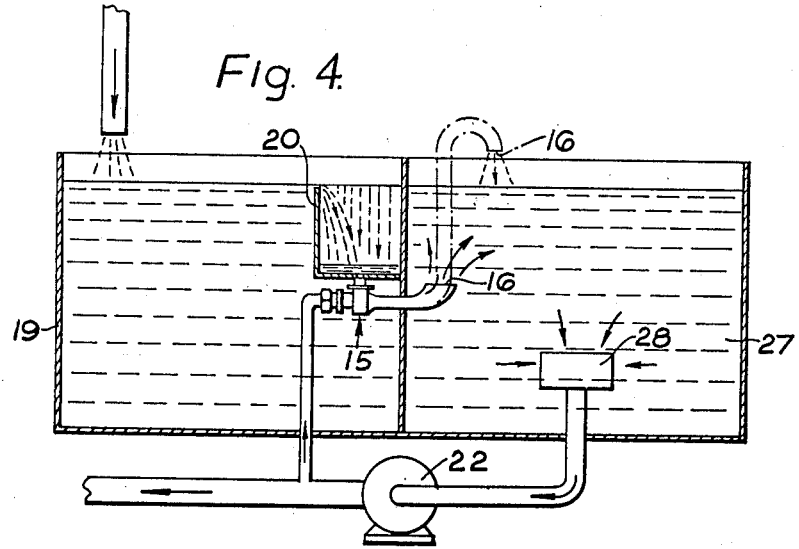

TREATING CONTAMINATED LIQUIDS

This is a division of application Ser. No. 647,735, filed Jan. 9, 1976 now U.S. Pat. No. 3,994,808 which is in turn a continuation of application Ser. No. 295,939, filed Oct. 10, 1972, abandoned which is in turn a continuation of application Ser. No. 51,954 filed July 2, 1970 abandoned.

This invention relates to a method and apparatus for treating liquids containing additional materials such as solid particles or one or more other liquids.

According to the invention, a method of treating a liquid containing additional material comprises causing a surface portion of the liquid to flow from the main body thereof, and reintroducing the removed surface liquid under pressure either into the main liquid body below the surface thereof or into a location outside the main liquid body.

Said location may conveniently be a separate liquid container and said removed surface portion may be introduced onto the surface of liquid in said separate container, or into the body of said liquid beneath the surface thereof as desired.

When the additional material is solid particles, some of which float on the surface of the liquid, the floating particles can be substantially completely sunk in accordance with the invention by causing a surface portion of the liquid containing the floating particles to flow from the main body of the liquid, and reintroducing said portion under pressure into the main body below the surface thereof.

This application of the invention can be usefully applied to the treatment of air-washing liquids used in paint spray booths, such as those used in spraying car bodies, for example, to facilitate removal of accumulated paint therefrom. In such booths, the majority of removed paint particles floats on the surface of washing liquid collected in a tank, but a minor portion, which may normally be up to about 30% of the paint, sinks to the bottom of the tank. This necessitates two residue removal operations, i.e. one from the liquid surface and another from the bottom of the tank, which is inconvenient and uneconomical.

By causing all the paint particles to sink to the bottom of the tank, the method of the invention greatly facilitates their removal from the tank.

The removed surface portion may conveniently be reintroduced by pump means or other suitable pressure means into the main body of the liquid, and it is thought that in this particular application to sinking paint particles the agitation of the liquid/paint mixture thus caused plays some part in breaking down the paint into suitable elements.

A further application of the invention concerns the mixing together or maintaining in mixed condition, of two or more materials of which one is either contained in or forms a body of liquid.

For this purpose, a surface portion of the liquids is caused to flow from the main body, and the removed surface liquid is either reintroduced under pressure into the main liquid body below the surface thereof or is introduced into a further body of liquid either below or on the surface of the latter.

This method may conveniently be used to maintain an even distribution of one material within another in cases where there is a tendency for the materials to separate out i.e. such as solid particles suspended in a liquid. It may be used to mix materials thoroughly as one is added to another, and may be useful, for example, in promoting homogenisation e.g. of milk.

From another aspect of the invention, apparatus for treating liquids comprises a reservoir for the liquid arranged to enable a surface portion of the liquid to flow continuously from the main body of the liquid and means for either reintroducing the removed surface portion into the main body of the liquid below the surface thereof or introducing it into a further liquid body either on to or below the surface thereof.

The reservoir may conveniently be a tank having one or more weirs of the same or different height, or of variable height, over which said liquid surface portion may leave the tank for collection in an auxiliary tank whence it is removed and reintroduced under pressure into the main liquid body or a further liquid body.

The removed liquid portion may be directed into the main liquid body, or into a further body of liquid in a separate tank, by suitable pump or pressure feed means which may conveniently be a venturi pump using liquid from the main body as the motive fluid. When a separate further tank is used, this may conveniently have a common wall with the first tank and the removed surface liquid is then passed through an aperture in said wall into the further tank.

In order that the invention may be more fully understood, some embodiments in accordance therewith will now be described, by way of example, with reference to the accompanying drawings in which:

FIG. 1 is a fragmentary general view of a paint spraying booth incorporating the liquid treatment apparatus of the invention;

FIG. 2 is an enlarged view, partly in section, of the treatment apparatus of FIG. 1;

FIG. 3 is a side elevation of another embodiment of the apparatus of the invention adapted for use as a mixer;

FIG. 4 is an elevation of a further embodiment in which the removed liquid surface portion is introduced into a further body of liquid in another container.

Referring to FIG. 1 of the drawings this shows a conventional spray booth and its associated air purification plant for removing paint mist from the air in the booth. Spraying takes place within the booth 1 and contaminated air is drawn by means of a fan (not shown) beneath a falling water curtain 2 and upwardly beyond the curtain where it is washed by downwardly directed water jets 3 and further cleaned by baffles and/or filters 4 before being allowed to pass out through a stack 5 into the surrounding air. A pump 6 driven by a motor 7 draws water from a tank 8 and supplies it along a pipe 9 first to the washing jets 3 and then into a trough 10 from which the water falls over a weir to form a curtain 2.

The tank 8, in which contaminated washing water is collected, contains the paint particle sinking apparatus of the invention in the form of a unit 11 located in a corner of the tank 8.

The unit 11 is shown enlarged and in greater detail in FIG. 2 and comprises an auxiliary tank 12, one side 13 of which forms a weir over which surface water from the tank 8 may flow into tank 12. The weir may be adjustable in height so that the flow of water thereover may be controlled, and the adjustment may be performed by any suitable manual or automatic means (not shown). At the centre of the bottom of the tank 12 is an outlet 14 connected to a hydraulic ejector in the form of a venturi pump 15, the outlet 16 of which is disposed beneath the surface of the liquid in the tank 8. The pump is connected via a pipe 17 to pipe 9 and thence to the pump 6 which draws water from the tank 8 through a filter box 8a and outlet 8b so that a continuous stream of water under pressure may be fed through the pump 15 and entrain liquid from the tank 12 which has flowed from the surface of the main body of the liquid in the tank 8 and has a high paint particle content. The pumping and entrained liquids are reintroduced into the liquid in the main tank 8 below the surface thereof and the paint particles sink to the bottom of the main tank as indicated at 18.

The apparatus shown in FIG. 3 enables the method of the invention to be used for mixing two or more materials such as foods for example, of which one is either contained in or forms a body of liquid. The apparatus comprises a reservoir 19 containing the main body of liquid, and an auxiliary tank 20 disposed generally co-axially within the reservoir, an outlet 21 from the tank 20 being disposed within the main liquid body below the surface thereof. Pumping water under pressure is supplied by pump 22 via pipes 23 and 24 through the tank 20 into the outlet 21 and entrains surface liquid from the container 19 collected in the container 20 and reintroduces it under pressure beneath the surface of the main liquid body in container 19. This action produces a very thorough agitation and mixing as indicated by the arrows.

The walls of the container 19 are shown hollow, and these may contain heating elements or form a jacket for steam for example to heat the liquid in the container 19. Alternatively, or in addition, a heater shown in broken lines at 25 may be disposed at the outlet in the tank 20 so that withdrawn surface liquid is ejected therethrough into the tank 19. If the liquid is heated by either of these means, or possibly by other suitable means, the mixing action produced by the apparatus engenders rapid and efficient heat exchange between the hotter and cooler portions of the liquid. A valve 26 is provided so that when the desired mixing (and possibly heating) has been achieved, a portion of the mixture may be led off for use or to a further processing station or possibly for packing into containers.

In an alternative arrangement, instead of using liquid from the reservoir as the motive liquid, a further fluid (liquid or steam for example) may be introduced under pressure from an independent source into the tank 20 to cause surface liquid to flow from tank 19 into tank 20 for recirculation as before. Such further fluid may itself be heated and thus heat the contents of reservoir 19 by heat exchange during recirculation.

Referring now to FIG. 4, this again has a main container 19 and an auxiliary tank 20 into which surface liquid flows from the main container. This embodiment employs a venturi pump 15 as in FIG. 2, but the outlet 16 of the pump is disposed within a further container 27, normally below the surface of the liquid therein as shown in full lines, but possibly above the surface of the liquid as shown in broken lines. The motive force for the pump 15 is supplied by a water pump 22 as in FIG. 3, and liquid is withdrawn by the pump 22 from the tank 27 through an outlet 28.

When the method and apparatus of the invention is used for mixing purposes, suitable dispensing and possibly measuring means may be provided to facilitate the introduction of additives, which may be for example detergents in some applications requiring emulsification or may be constituents of the required mixture such as foods.

Foaming of foamable materials such as detergents during mixing may be minimised by mixing them by the method of the invention. Moreover, foam formed on a liquid surface may be dispersed by causing it to flow from the surface and introducing it below the surface.

A further application of the invention relates to the removal or dispersal of oil slicks. The apparatus of the invention may be disposed with its tank placed just below the surface of the ocean or river for example on which a slick is formed, and the removed surface liquid, which will be mostly oil, may be pumped into another container, such as the hold of a tanker for example.

I claim:

1. An apparatus for dispersing a material in a liquid, comprising
    (1) a liquid reservoir for holding a body of liquid having a surface portion containing said material,
    (2) a chamber for receiving the surface portion of the body of liquid, said chamber being dispersed centrally in the reservoir,
    (3) a weir bounding the chamber and positioned in respect of the reservoir to permit gravity flow of the surface portion of the body of liquid over the weir into the chamber,
    (4) a venturi pump means having
        (a) a first outlet for a motive fluid,
        (b) a suction inlet communicating with the chamber, and
        (c) an outlet,
    (5) means for delivering the motive fluid under pressure to the first inlet of the venturi pump means whereby the surface portion of the body of liquid is drawn from the chamber through the suction inlet into the venturi pump means, and
    (6) the outlet of the venturi pump means opening downwardly into the reservoir centrally thereof and thereby into the liquid wherein the material is to be dispersed below the surface of the liquid.

2. The apparatus of claim 1, wherein the means for delivering the motive fluid comprises a pump having an inlet communicating with the reservoir to draw liquid therefrom to form the motive fluid and an outlet communicating with the first inlet of the venturi pump means.

3. The apparatus of claim 2, further comprising filter means in the reservoir at the inlet of the pump to prevent passage of foreign bodies into the pump.

4. In a paint-spraying booth having means for washing air in the booth with a washing liquid to remove paint particles and a reservoir in which the washing liquid collects with the paint particles floating on a surface portion thereof, the improvement comprising
    (1) a chamber for receiving the surface postion of the washing liquid containing the paint particles,
    (2) a weir bounding the chamber and positioned in respect of the reservoir to permit gravity flow of the surface portion of the washing liquid over the weir into the chamber,
    (3) a venturi pump means having
        (a) a first inlet for a motive fluid,
        (b) a suction inlet communicating with the chamber, and
        (c) an outlet,
    (4) means for delivering the motive fluid under pressure to the first inlet of the venturi pump means whereby the surface portion of the washing liquid containing the paint particles is drawn from the chamber and entrained through the suction inlet into the venturi pump means, and (5) the outlet of the venturi pump means opening into the reservoir below the surface of the washing liquid therein to disperse the surface portion of the washing liquid entrained through the venturi pump means in the washing liquid whereby the solid constituents of the paint particles are separated from the liquid constituents and fall to the bottom of the reservoir.

5. In a paint-spraying booth of claim 4, wherein the means for delivering the motive fluid comprises a pump having an inlet and an outlet, a first conduit means connecting an outlet of the reservoir with the pump inlet to draw washing liquid therefrom to form the motive fluid, a filter mounted over the reservoir outlet to prevent foreign bodies entering the first conduit means, and a second conduit means connecting the pump outlet to the first inlet of the venturi pump means.

6. The apparatus of claim 4, in which said liquid reservoir is disposed to collect washing liquid from a paint-spraying booth whereby the said surface portion contains floating paint, the dispersal of said paint in the body of washing liquid in the reservoir causing the solid constituents of the paint particles to separate from the liquid constituents and fall to the bottom of the reservoir.

* * * * *